(No Model.)
W. M. HOUGH.
FILTER.
No. 423,767. Patented Mar. 18, 1890.
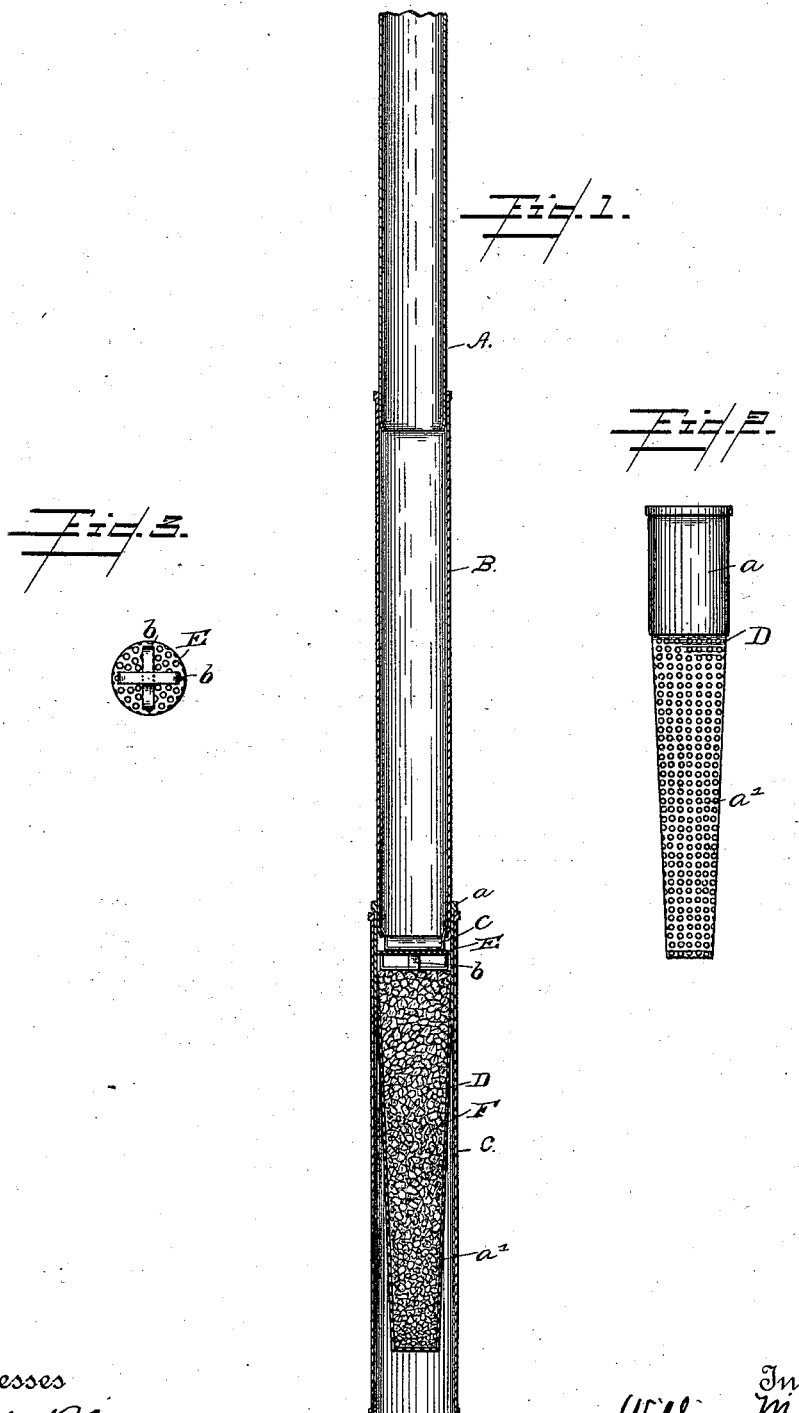

UNITED STATES PATENT OFFICE.

WILLIAM M. HOUGH, OF UPPER SANDUSKY, OHIO.

FILTER.

SPECIFICATION forming part of Letters Patent No. 423,767, dated March 18, 1890.

Application filed September 30, 1889. Serial No. 325,512. (No model.)

*To all whom it may concern:*

Be it known that I, WILLIAM M. HOUGH, a citizen of the United States, residing at Upper Sandusky, in the county of Wyandot and State of Ohio, have invented certain new and useful Improvements in Filters; and I do declare the following to be a full, clear, and exact description of the invention, such as will enable others skilled in the art to which it appertains to make and use the same.

My invention relates to certain new and useful improvements in filters.

The object of the invention is to obtain a device of the character named which will be especially adapted to use as a cistern-filter, and which will be simple in construction, convenient in use, and which will perform its functions with certainty and effectiveness; and to the accomplishment of these ends the invention consists of certain novel parts and combination of parts, as will be fully described and specially claimed, reference being had to the accompanying drawings, in which—

Figure 1 is a vertical section through my filter and the pipes connected therewith; Fig. 2, a detail view of the filter-basket, and Fig. 3 a view in detail of a cover used in combination with the filter-basket.

D represents my improved filter-basket, which consists of solid portion *a* and perforated part *a'*, the latter tapering toward its lower ends, so as to leave a space between it and the inner wall of section C, in which this basket is adapted to be placed when in use.

E represents a cover of a convenient size to fit in the upper end of the basket D and rest upon the filtering material with which such basket is provided. Cover E is perforated, as shown, to allow of the passage therethrough of the water to be filtered, and on its lower face is provided with feet *b*, which consists of strips secured to the cover and preferably crossing each other at right angles, as shown, such feet being provided to keep the cover free of the filtering material at all times.

To the lower end of section B, I secure a strip *c*, arranged to rest upon the upper face of cover E when the parts are in position for use.

The manner of using my device is as follows: The basket D is first filled with filtering material F, preferably charcoal and gravel, a suitable amount being used to fill the basket up to within a few inches of the top. The cover E is then placed in the basket, the feet with which it is provided resting upon the filtering material, the cover proper being thus entirely free of the filtering material. The basket is then placed in section C, occupying the position shown in Fig. 1. The lower end of pipe B is then inserted into the upper end of pipe C and rests upon the cover E, thus securely holding the filtering material in place. Pipe B is telescoped upon pipe A, and connection thus made with the spout.

When it is desired to remove basket D for the purpose of cleaning or renewing the filtering material, pipe B is moved upwardly, sliding upon pipe A, and the basket removed.

By the arrangement and construction of parts as described it will be seen that the water will be thoroughly filtered and will pass off through the sides of the perforated portion of the filtering-basket, the taper in such basket leaving a space between it and the pipe C. By providing the cover E with the feet referred to such cover is always held a suitable distance from the filtering material, and in cases where anything liable to decompose—such as a dead bird—enters the pipe it will not be brought in contact with the filtering material, which it could seriously affect if this provision were not made.

What I claim is—

The combination, with a filtering-basket and a perforated cover therefor, of telescopic pipes, one of which rests upon such cover, as set forth.

In testimony whereof I affix my signature in presence of two witnesses.

WILLIAM M. HOUGH.

Witnesses:
W. F. POOL,
T. E. BEERY.